United States Patent
Aoki

(10) Patent No.: US 12,200,291 B2
(45) Date of Patent: Jan. 14, 2025

(54) RECEPTION APPARATUS, RECEPTION METHOD, AND TRANSMISSION AND RECEPTION SYSTEM

(71) Applicant: SONY GROUP CORPORATION, Tokyo (JP)

(72) Inventor: Yoshikazu Aoki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 457 days.

(21) Appl. No.: 17/624,100

(22) PCT Filed: Jul. 1, 2020

(86) PCT No.: PCT/JP2020/025781
§ 371 (c)(1),
(2) Date: Dec. 30, 2021

(87) PCT Pub. No.: WO2021/006137
PCT Pub. Date: Jan. 14, 2021

(65) Prior Publication Data
US 2022/0360845 A1    Nov. 10, 2022

(30) Foreign Application Priority Data
Jul. 9, 2019  (JP) .................................. 2019-127484

(51) Int. Cl.
*H04N 21/43*   (2011.01)
*H04N 5/067*   (2006.01)
*H04N 21/4385* (2011.01)

(52) U.S. Cl.
CPC ....... *H04N 21/43076* (2020.08); *H04N 5/067* (2013.01); *H04N 21/4385* (2013.01)

(58) Field of Classification Search
CPC ............. H04N 21/43076; H04N 5/067; H04N 21/4385
See application file for complete search history.

(56) References Cited

U.S. PATENT DOCUMENTS

2008/0095093 A1*   4/2008   Oogushi ............... H04L 12/185
                                                        370/312
2008/0209466 A1*   8/2008   Ishida .................. H04N 21/814
                                                        725/33

(Continued)

FOREIGN PATENT DOCUMENTS

| JP | 2004-194094 A | 7/2004 |
| JP | 2009-38448 A | 2/2009 |
| WO | WO 2018/088402 A1 | 5/2018 |

OTHER PUBLICATIONS

International Search Report issued Sep. 1, 2020 in PCT/JP2020/025781 filed Jul. 1, 2020, 2 pages.

*Primary Examiner* — Kyu Chae
(74) *Attorney, Agent, or Firm* — Oblon, McClelland, Maier & Neustadt, L.L.P.

(57) ABSTRACT

Initial synchronization is achieved without depending on fluctuations of a transmission packet transfer delay time in a network.
An IP packet having a multiplexed transport packet containing media data is received via a network. The IP packet is processed, and media presentation by the media data is controlled. A presentation timing is controlled on the basis of a network delay time in communication between a transmission side and a reception apparatus via the network. For example, the multiplexed transport packet is a TS packet making up an MPEG-2 transport stream.

19 Claims, 11 Drawing Sheets

(56) References Cited

U.S. PATENT DOCUMENTS

| | | | |
|---|---|---|---|
| 2013/0003757 A1* | 1/2013 | Boatright | H04N 21/4381 370/474 |
| 2013/0136218 A1* | 5/2013 | Kure | H04N 19/00 375/356 |
| 2018/0192099 A1* | 7/2018 | Takahashi | H04N 21/4305 |
| 2019/0261439 A1 | 8/2019 | Itagaki et al. | |

* cited by examiner

RECEPTION APPARATUS, RECEPTION METHOD, AND TRANSMISSION AND RECEPTION SYSTEM

TECHNICAL FIELD

The present technology relates to a reception apparatus, a reception method, and a transmission and reception system, and relates to a reception apparatus that receives, via a network, an IP packet having a multiplexed transport packet containing media data, and the like.

BACKGROUND ART

For example, Patent Document 1 describes a technology capable of adjusting the number of additional intra-frames to be inserted into video data to be transmitted via each channel, thereby reducing a channel change delay time while increasing network efficiency. This technology is not a technology for reducing a delay between an encoding device and a decoding device, but is a technology for reducing a time until image output in changing a channel.

CITATION LIST

Patent Document

Patent Document 1: Japanese Patent Application Laid-Open No. 2009-038448

SUMMARY OF THE INVENTION

Problems to be Solved by the Invention

An object of the present technology is to achieve initial synchronization without depending on fluctuations of a transmission packet transfer delay time in a network.

Solutions to Problems

A concept of the present technology involves a reception apparatus including:
- a receiver configured to receive, via a network, an IP packet having a multiplexed transport packet containing media data; and
- a presentation controller configured to process the IP packet and to control media presentation by the media data,
- in which
- the presentation controller controls a presentation timing on the basis of a network delay time in communication between a transmission side and the reception apparatus via the network.

In the present technology, the receiver receives an IP packet having a multiplexed transport packet containing media data, via the network. The presentation controller processes the IP packet and controls media presentation by the media data. The presentation controller controls a presentation timing on the basis of a network delay time in communication between the transmission side and the reception apparatus via the network. For example, the network delay time may be based on information of time-of-day synchronization between the transmission side and the reception apparatus. In this case, for example, the time-of-day synchronization may be time-of-day synchronization using a PTP. For example, the reception apparatus may further include a presentation unit configured to perform the media presentation by the media data.

For example, the presentation controller may control the presentation timing on the basis of clock information of the reception apparatus, the clock information being brought into time-of-day synchronization with clock information of the transmission side. In this case, for example, the presentation controller may control the presentation timing, using first time-of-day information that is based on a system time clock of the transmission side and is contained in the multiplexed transport packet, second time-of-day information that is based on the clock information of the transmission side, is associated with this first time-of-day information, and is contained in the multiplexed transport packet, the network delay time, and the clock information of the reception apparatus.

For example, the multiplexed transport packet may be a TS packet making up an MPEG-2 transport stream. A program clock reference (PCR) packet may contain a PCR value as the first time-of-day information and the second time-of-day information associated with this PCR value. The TS packet may contain a presentation time stamp (PTS) value on a media data presentation basis. The presentation controller may set the presentation timing at a timing at which a time of day indicated by the clock information of the reception apparatus is a predetermined time of day that is not less than a time of day obtained by adding, to the second time-of-day information, the network delay time and a time corresponding to a value obtained by subtracting the PCR value from the PTS value.

In the present technology, as described above, a presentation timing is controlled on the basis of a network delay time in communication between the transmission side and the reception apparatus via the network. Therefore, initial synchronization is achieved without depending on fluctuations of an IP packet transfer delay time in the network. It is possible to achieve a reduction in memory and low-latency encoding/decoding without unnecessary data accumulation for avoiding the underflow of a decoder buffer. Furthermore, it is possible to prevent occurrence of skipping for suppression of buffer overflow owing to unnecessary data accumulation and repetition owing to buffer underflow. It is also possible to improve media presentation quality.

Furthermore, another concept of the present technology involves a transmission and reception system including:
- a transmission apparatus; and
- a reception apparatus connected to the transmission apparatus via a network,
- in which
- the transmission apparatus includes
  - a transmitter configured to transmit an IP packet having a multiplexed transport packet containing media data to the reception apparatus via the network,
- the reception apparatus includes:
  - a receiver configured to receive the IP packet from the transmission apparatus via the network; and
  - a presentation controller configured to process the IP packet and to control media presentation by the media data, and
- the presentation controller controls a presentation timing on the basis of a network delay time in communication between the transmission apparatus and the reception apparatus via the network.

In the present technology, the transmission and reception system includes the transmission apparatus and the reception apparatus connected to this transmission apparatus via the network. For example, the transmission apparatus may be a camera. Furthermore, for example, the reception apparatus may be a display.

The transmission apparatus includes the transmitter. This transmitter transmits an IP packet having a multiplexed transport packet containing media data to the reception apparatus via the network. For example, the multiplexed transport packet may be a TS packet making up an MPEG-2 transport stream.

The reception apparatus includes the receiver and the presentation controller. The receiver receives the IP packet from the transmission apparatus via the network. The presentation controller processes the IP packet and controls media presentation by media data. The presentation controller controls a presentation timing on the basis of a network delay time in communication between the transmission apparatus and the reception apparatus via the network. For example, the network delay time may be based on information of time-of-day synchronization between the transmission apparatus and the reception apparatus. In this case, for example, the time-of-day synchronization may be time-of-day synchronization using a PTP.

For example, the presentation controller may control the presentation timing on the basis of clock information of the reception apparatus, the clock information being brought into time-of-day synchronization with clock information of the transmission apparatus. In this case, for example, the presentation controller may control the presentation timing, using first time-of-day information that is based on a system time clock of the transmission apparatus and is contained in the multiplexed transport packet, second time-of-day information that is based on the clock information of the transmission apparatus, is associated with this first time-of-day information, and is contained in the multiplexed transport packet, the network delay time, and the clock information of the reception apparatus.

Here, for example, the multiplexed transport packet may be a TS packet making up an MPEG-2 transport stream. A PCR packet may contain a PCR value as the first time-of-day information and the second time-of-day information associated with this PCR value. The TS packet may contain a PTS value on a media data presentation basis. The presentation controller may set the presentation timing at a timing at which a time of day indicated by the clock information of the reception apparatus is a predetermined time of day that is not less than a time of day obtained by adding, to the second time-of-day information, the network delay time and a time corresponding to a value obtained by subtracting the PCR value from the PTS value.

In the present technology, as described above, the reception apparatus controls a presentation timing on the basis of a network delay time in communication between the transmission side and the reception apparatus via the network. Therefore, initial synchronization is achieved without depending on fluctuations of an IP packet transfer delay time in the network. It is possible to achieve a reduction in memory and low-latency encoding/decoding without unnecessary data accumulation for avoiding the underflow of a decoder buffer. Furthermore, it is possible to prevent occurrence of skipping for suppression of buffer overflow owing to unnecessary data accumulation and repetition owing to buffer underflow. It is also possible to improve media presentation quality.

Note that in the present technology, for example, the reception apparatus may include a plurality of the reception apparatuses, and each reception apparatus may set the network delay time at a maximum time of the network delay times between the transmission apparatus and the plurality of the reception apparatuses or a time longer than the maximum time. It is therefore possible to equalize media presentation timings found by the respective reception apparatuses and to achieve synchronization on media presentation in the respective reception apparatuses. In this case, for example, an L3 switch may be disposed between the transmission apparatus and the plurality of the reception apparatuses, and the IP packet output from the transmission apparatus may be multicast to the plurality of the reception apparatuses. Furthermore, in this case, for example, the multiplexed transport packet may be a TS packet making up an MPEG-2 transport stream, and a PCR packet may further contain information of the network delay time. Therefore, each reception apparatus can easily acquire a network delay time for finding a presentation timing and can appropriately find the presentation timing.

MODE FOR CARRYING OUT THE INVENTION

Hereinafter, a description will be given of a mode for carrying out the invention (hereinafter, referred to as an "embodiment"). Note that the description is given in the following order.
1. First Embodiment
2. Second Embodiment
3. Modifications

1. First Embodiment

"Transmission and Reception System"

Figure 1:
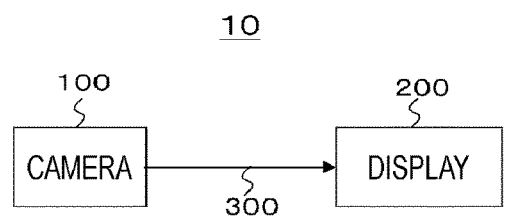
FIG. 1 is a block diagram that illustrates a configuration example of a transmission and reception system as a first embodiment.

FIG. 1 illustrates a configuration example of a transmission and reception system 10 as a first embodiment. This transmission and reception system 10 includes a camera 100 and a display 200 connected to this camera 100 via a network 300. The camera 100 makes up a transmission apparatus, and the display 200 makes up a reception apparatus. The network 300 is a wired or wireless network. The network 300 is not limited to an existing network. For example, the network 300 may be a network that adopts Fifth-Generation Mobile Communications System (5G) as the next-generation communication standard.

The camera 100 transmits an IP packet having a multiplexed transport packet containing media data to the display 200 via the network 300. The media data contains data such as video data and audio data. As a multiplexed transport stream, there is a transport stream of Moving Picture Experts Group phase 2 (MPEG-2), MPEG Media Transport (MMT), or the like.

In a case where the multiplexed transport stream is an MPEG-2 transport stream, the multiplexed transport packet is a transport packet (a TS packet). Furthermore, in a case where the multiplexed transport stream is an MMT stream, the multiplexed transport packet is an MMT packet. In this embodiment, a description is given of a case where the multiplexed transport stream is an MPEG-2 transport stream (hereinafter, simply referred to as a "transport stream").

The display 200 processes an IP packet transmitted from the camera 100, and performs media presentation by media data. That is, the display 200 displays an image based on video data and outputs a sound based on audio data.

Figure 2:
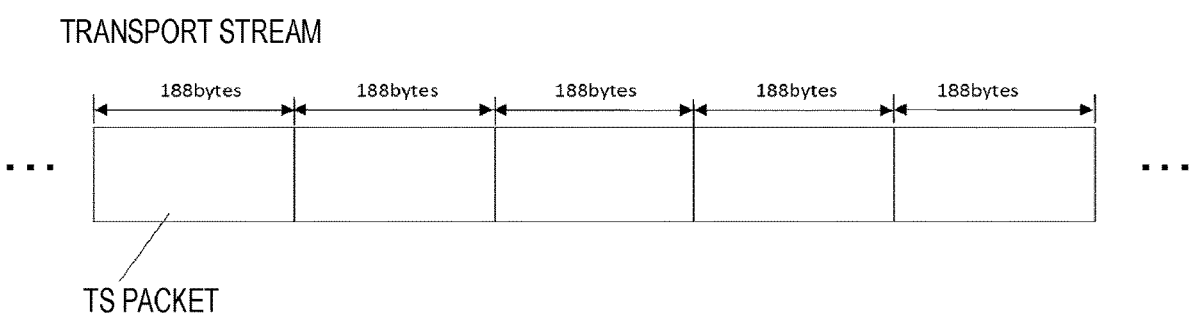
FIG. 2 is a diagram for explaining an MPEG-2 transport stream.

Here, a description is given of a transport stream. As illustrated in FIG. 2, a transport stream is a stream of packets each fixed at a length of 188 bytes. Each packet is referred to as a transport packet (TS packet).

Figure 3:
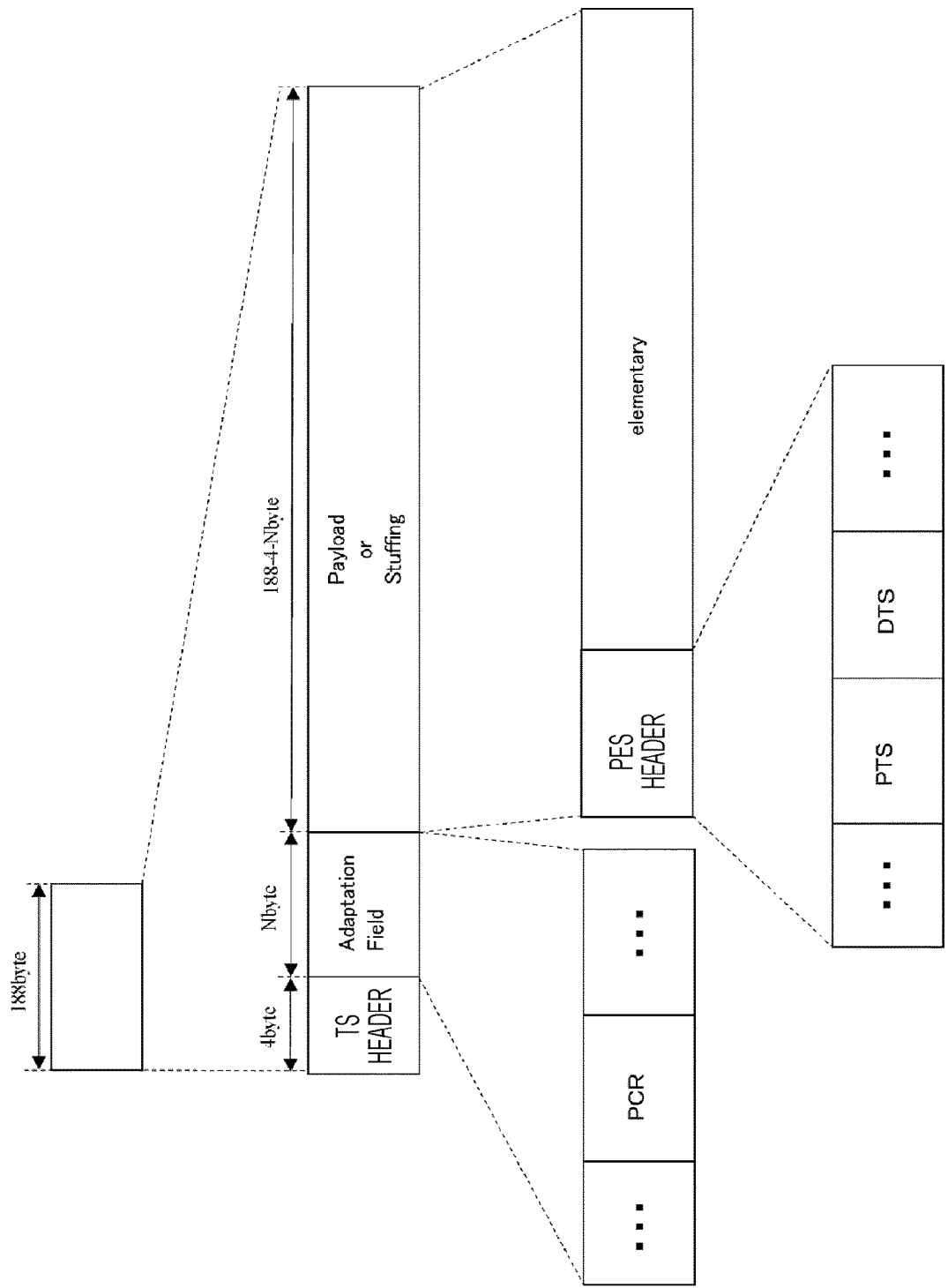
FIG. 3 is a diagram for explaining a TS packet.

As illustrated in FIG. 3, each TS packet includes a 4-byte header which is called a TS header, a field which is called an adaptation field and in which variable-length additional information is inserted, and a field in which a payload or stuffing data is inserted.

One of the additional information inserted into the adaptation field is 27-MHz time-of-day information (clock count value) which indicates a reference time of day of the transport stream and is called a program clock reference (PCR). A TS packet in which this PCR is present is called a PCR packet. Note that, in this PCR packet, data following the adaptation field is stuffing data in many cases.

Furthermore, a field called a packetized elementary stream (PES) header is inserted into the payload every certain cycle in addition to video and audio elementary data. Information called a decode time stamp (DTS) indicating a decode time of day of the elementary data following immediately after the PES header and information called a presentation time stamp (PTS) indicating a presentation time of day are present in the PES header.

In general, synchronization between an encoder and a decoder is made by conforming a PCR to a 27-MHz system time clock (STC) in the decoder at the arrival of the PCR packet on the decoder side. Furthermore, an image is displayed and a sound is output when the STC and the PTS satisfy Mathematical Formula (1) below.

$$PTS \leq STC \qquad (1)$$

Figure 4:
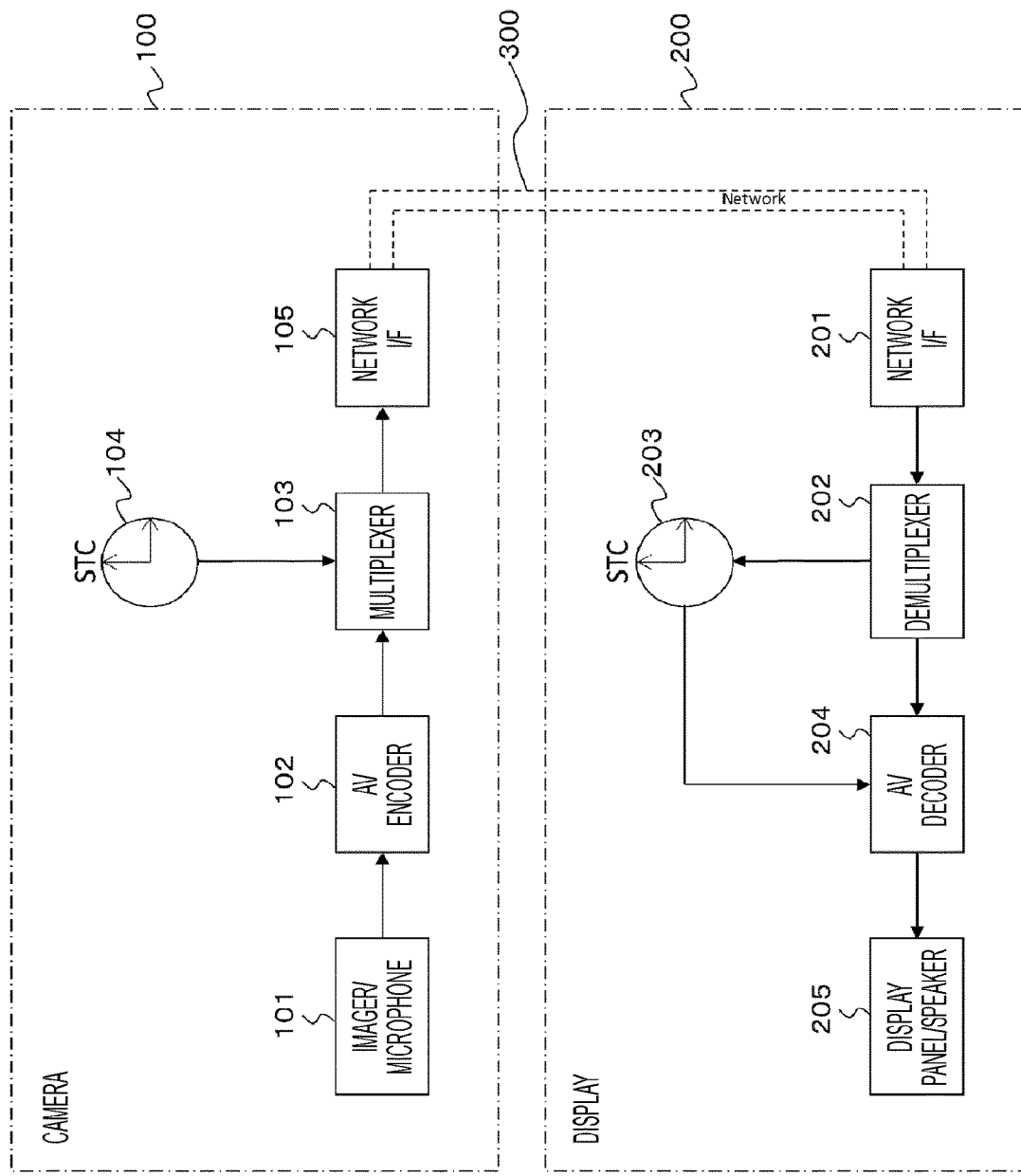
FIG. 4 is a block diagram that illustrates configuration examples of a camera and a display making up the transmission and reception system.

FIG. 4 illustrates configuration examples of the camera 100 and display 200. The camera 100 includes an imager/microphone 101, an AV encoder 102, a multiplexer 103, a system time clock generator 104, and a network interface 105.

The imager/microphone 101 outputs video data obtained in such a manner that an imager captures an image, and audio data obtained in such a manner that a microphone collects a sound. The AV encoder 102 encodes the video data and the audio data each obtained by the imager/microphone 101.

The system time clock generator 104 generates a 27-MHz system time clock STC as time-of-day information. The multiplexer 103 refers to the STC generated by the system time clock generator 104, and generates a PCR packet including an adaptation field containing information of a PCR value (PCR'). Then, the multiplexer 103 multiplexes this PCR packet into a transport stream together with the encoded video data and audio data and a PTS as presentation time-of-day information of the encoded video data and audio data.

The network interface 105 converts the transport stream obtained by the multiplexer 103 into an IP packet, and transmits the IP packet as a transmission packet to the display 200 via the network 300.

The display 200 includes a network interface 201, a demultiplexer 202, a system time clock generator 203, an AV decoder 204, and a display panel/speaker 205.

The network interface 201 receives the IP packet transmitted from the camera 100 via the network 300. Furthermore, this network interface 201 removes an IP header and the like from the IP packet to convert the IP packet into a transport stream.

The demultiplexer 202 separates the transport stream obtained at the network interface 201 into the PCR packet, the video data, the audio data, and the PTS as the presentation time-of-day information of the video data and the audio data, and sets the PCR' acquired from the PCR packet for the system time clock generator 203.

The AV decoder 204 decodes the video data and the audio data each obtained by the demultiplexer 202, compares the STC generated by the system time clock unit 203 with the PTS, and adjusts an image display and sound output timing. At the image display and sound output timing (see Mathematical Formula (1) above), then, the AV decoder 204 transmits the data to the display panel/speaker 205, and the display panel/speaker 205 displays an image and outputs a sound.

The configuration examples of the camera 100 and display 200 in FIG. 4 are premised on a system in which a TS packet is transmitted from the camera 100 and received by the display 200 at regular intervals. In a case where the TS packet is transmitted and received via the network 300, the TS packet may be received in a burst manner or may be delayed.

Figure 5:
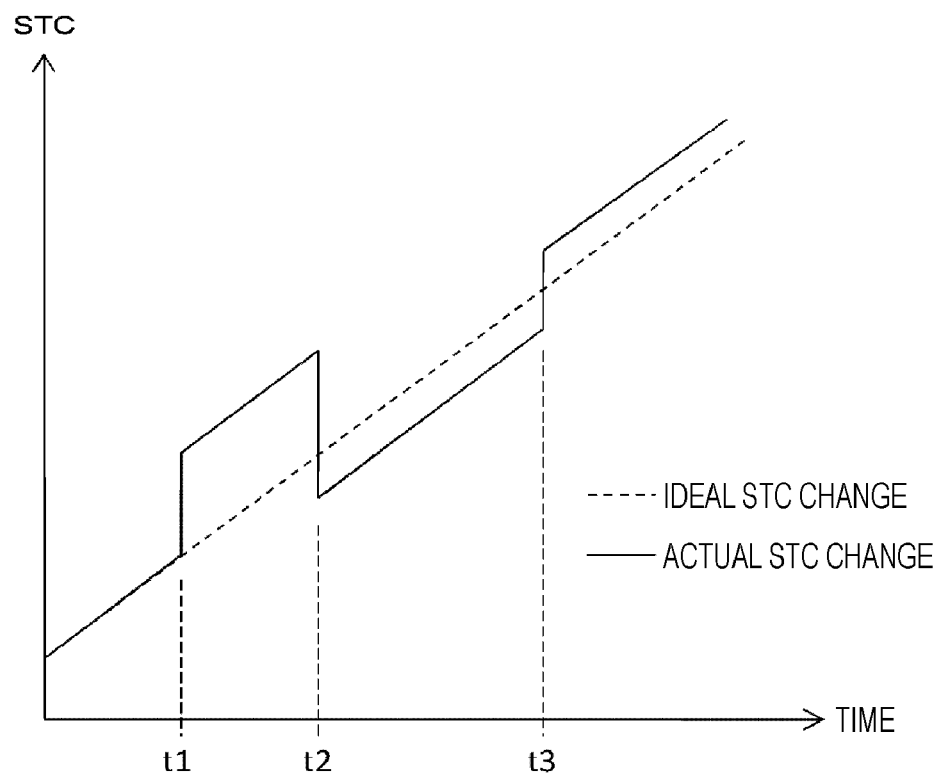
FIG. 5 is a diagram that illustrates a comparison between an ideal STC change and an actual STC change.

Therefore, as illustrated in a graph of FIG. 5, an actual change of the STC generated by the system clock generator 203 of the display 200 largely fluctuates as compared with an ideal STC change, which makes it impossible to achieve synchronization between the camera 100 side and the display 200 side. Note that in the graph example of FIGS. 5, t1, t2, and t3 each indicate a timing at which a PCR packet arrives at the display 200.

In this case, the PCR packet which has arrived at the timing t1 arrives earlier than a timing at which the PCR packet should originally arrive, so that an STC value at this timing is larger than an ideal value. Furthermore, the PCR packet which has arrived at the timing t2 arrives later than a timing at which the PCR packet should originally arrive, so that an STC value at this timing is smaller than the ideal value.

Furthermore, the PCR packet which has arrived at the timing t3 arrives earlier than a timing at which the PCR packet should originally arrive, so that an STC value at this timing is larger than the ideal value.

As described above, when the STC synchronization between the camera 100 side and the display 200 side cannot be achieved, presentation repetition or skipping occurs due to the underflow or overflow of a decoder buffer, which causes a problem in that media presentation quality is degraded. Furthermore, it is conceivable to increase an accumulation time in the decoder buffer in order to avoid the underflow of the decoder buffer. This case however causes a problem of an increase in delay between the encoding and the decoding.

Figure 6:
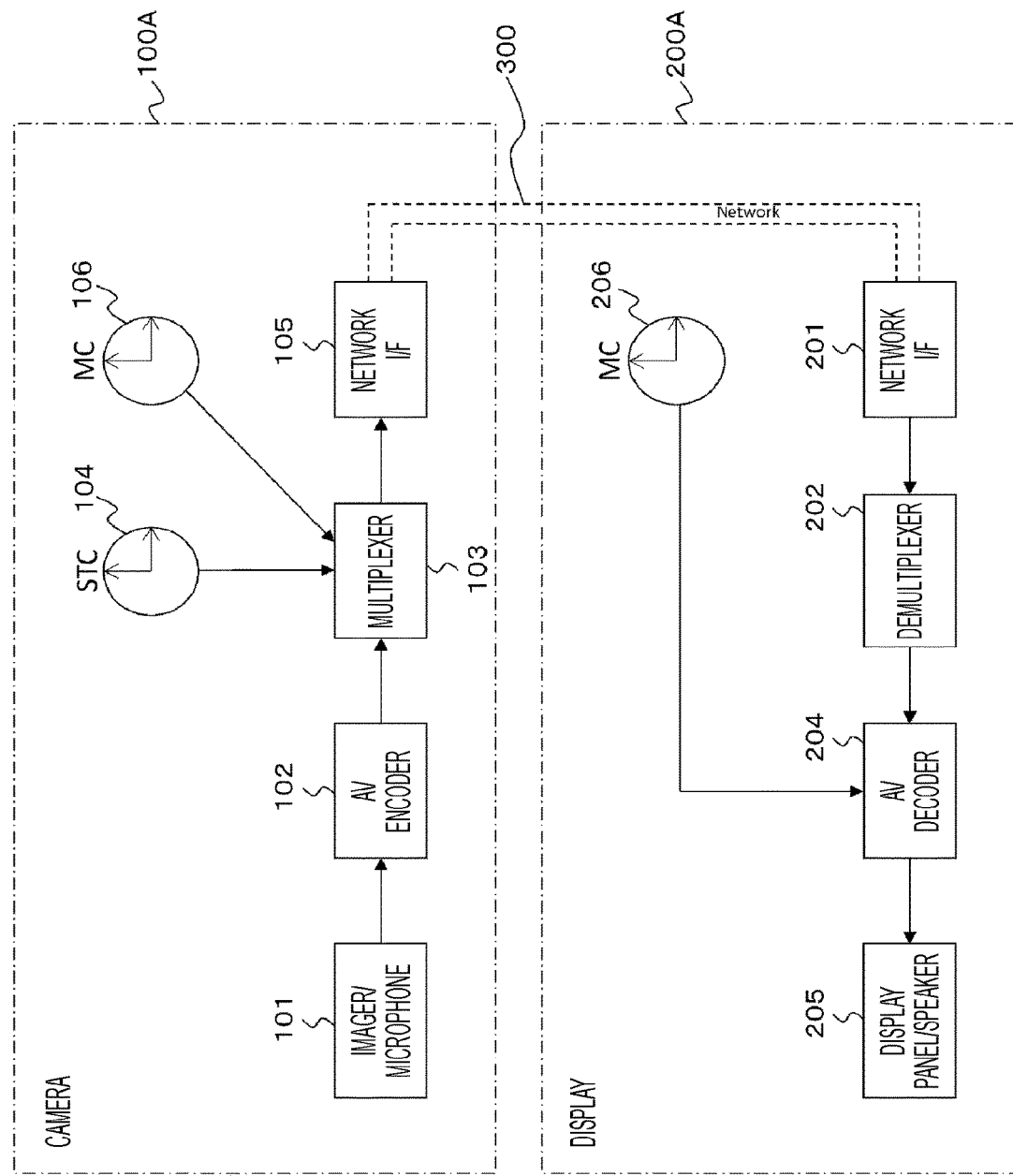
FIG. 6 is a diagram that illustrates another configuration examples of the camera and the display making up the transmission and reception system.

FIG. 6 illustrates another configuration examples of the camera 100 and display 200 making up the transmission and reception system 10 in FIG. 1. In FIG. 6, constituent elements corresponding to those in FIG. 4 are denoted with the identical reference signs, and the detailed description thereof is omitted as appropriate. Here, a camera 100A and a display 200A are described for discrimination from the configuration examples in FIG. 4.

The camera 100A includes an imager/microphone 101, an AV encoder 102, a multiplexer 103, a system time clock generator 104, a network interface 105, and a master clock generator 106. Furthermore, the display 200A includes a network interface 201, a demultiplexer 202, an AV decoder 204, a display panel/speaker 205, and a master clock generator 206.

A master clock (clock information) generated by the master clock generator 106 of the camera 100A and a master clock (clock information) generated by the master clock generator 206 of the display 200A are synchronized with each other in advance, using a precision time protocol (PTP) and the like pursuant to, for example, an IEEE 1588 standard. Note that synchronization using a network time protocol (NPT) is achieved with ms (millisecond)-unit accuracy between a server and a client, whereas the synchronization using the PTP can be achieved in 1 μs (microsecond) or less.

Figure 7:
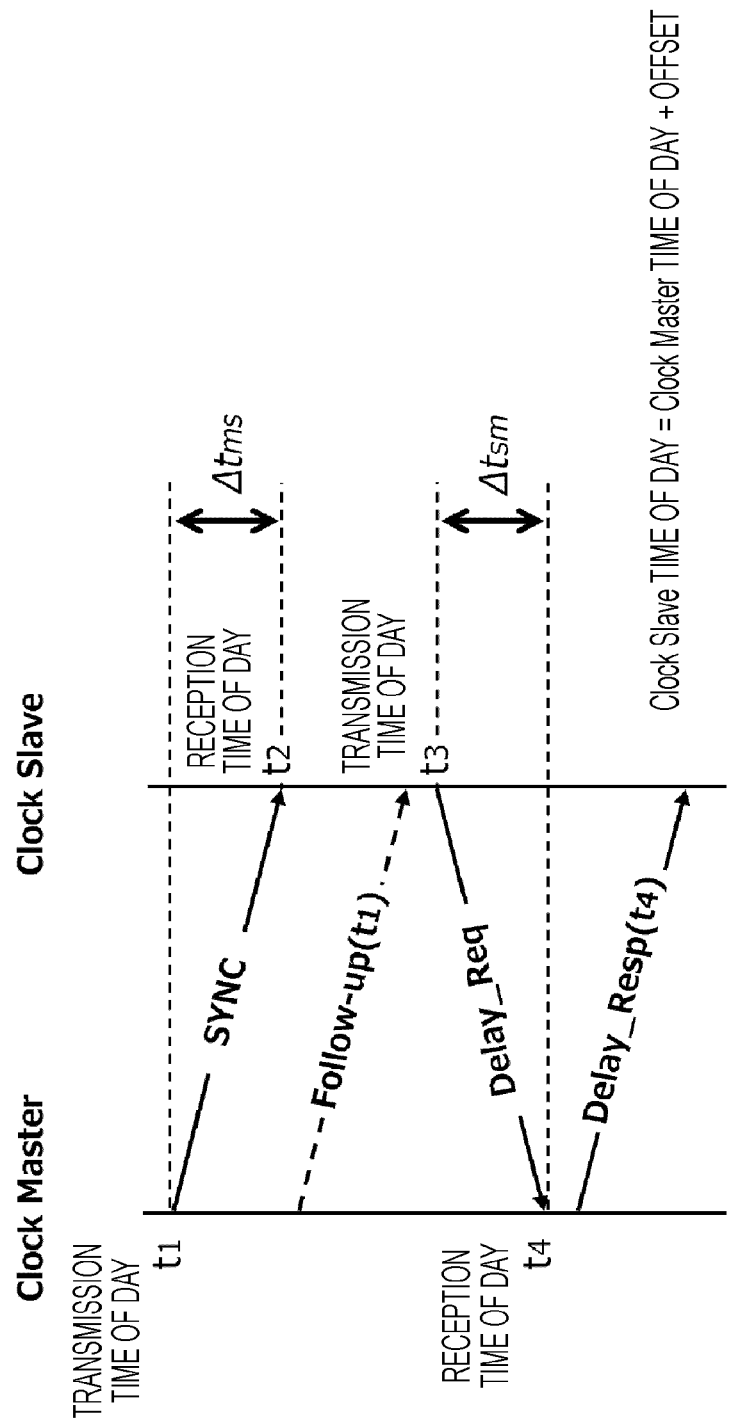
FIG. 7 is a diagram that illustrates an operation outline of a precision time protocol (PTP) pursuant to an IEEE 1588 standard.

FIG. 7 illustrates an operation outline of the PTP. In this protocol, one of two devices serves as a clock master and the other device serves as a clock slave. First, the clock master transmits a correction value measuring SYNC frame to the clock slave. Then, the transmission time of day is set at a "time of day t1". This time of day t1 corresponds to a measurement time of day in the clock master device. Furthermore, a time of day at which the SYNC frame arrives at the clock slave is set at a "time of day t2". This time of day t2 corresponds to a measurement time of day in the clock slave device.

Next, the clock master notifies the clock slave of the measured "time of day t1" with a Follow-up frame. The clock slave can thus acquire a propagation delay time from the clock master to the clock slave. As a result, the propagation delay time Δtms from the clock master to the clock slave is represented by Mathematical Formula (2) below.

$$\Delta tms = t2 - t1 = \text{Delay}(\text{Master} \rightarrow \text{Slave}) + \text{offset} \quad (2)$$

Next, the clock slave transmits a Delay_Request frame and measures the transmission time of day "time of day t3". The clock master measures a reception time of day "time of day t4" of the Delay_Request frame and notifies the clock slave of the measurement value with a Delay Response frame. As a result, the propagation delay time Δtsm from the clock slave to the clock master is represented by Mathematical Formula (3) below.

$$\Delta tsm = t4 - t3 = \text{Delay}(\text{Slave} \rightarrow \text{Master}) + \text{offset} \quad (3)$$

A time-of-day offset value offset between the clock master and the clock slave is calculated from propagation path symmetry between Mathematical Formula (2) and Mathematical Formula (3), as represented by Mathematical Formula (4) below.

$$\text{offset} = \tfrac{1}{2}\{(t2-t1)-(t4-t3)\} \quad (4)$$

Therefore, if a propagation delay from the clock master to the clock slave or from the clock slave to the clock master is symmetric and a frame transmission and reception time of day (t1, t2, t3, t4) can be accurately measured, the offset value can be derived with high accuracy. Using this offset value, it is possible to achieve synchronization between the time-of-day information of the clock master and the time-of-day information of the clock slave.

The imager/microphone 101 outputs video data obtained in such a manner that an imager captures an image, and audio data obtained in such a manner that a microphone collects a sound. The AV encoder 102 encodes the video data and the audio data each obtained by the imager/microphone 101.

The system time clock generator 104 generates a 27-MHz system time clock STC as time-of-day information. The multiplexer 103 refers to the STC generated by the system time clock generator 104 to generate a PCR packet including an adaptation field containing information of a PCR value (PCR') as a reference time of day of a stream. In addition, the multiplexer 103 inserts, into the stuffing region of the PCR packet, information of an MC' of the master clock generated by the master clock generator 106. The MC' is a time of day brought into one-to-one correspondence with the PCR' described above. Then, the multiplexer 103 multiplexes this PCR packet into a transport stream together with the encoded video data and audio data and a PTS as presentation time-of-day information of the encoded video data and audio data.

The network interface 105 converts the transport stream obtained by the multiplexer 103 into an IP packet, and transmits the IP packet as a transmission packet to the display 200A via the network 300. Here, the network interface 105 makes up a transmitter.

The network interface 201 of the display 200A receives the IP packet transmitted from the camera 100A via the network 300. Furthermore, this network interface 201 removes an IP header and the like from the IP packet to convert the IP packet into a transport stream. Here, the network interface 201 makes up a receiver.

The demultiplexer 202 separates the transport stream obtained at the network interface 201 into the PCR packet, the video data, the audio data, and the PTS as the presentation time-of-day information of the video data and the audio data, and extracts the PCR' and the MC' from the PCR packet. Then, the demultiplexer 202 transmits the PCR', the MC', the video data, the audio data, and the PTS to the AV decoder 204.

The AV decoder 204 decodes the video data and the audio data each obtained by the demultiplexer 202. When the master clock MC generated by the master clock generator 206 satisfies Mathematical Formula (5) below, the AV decoder 204 transmits the data to the display panel/speaker 205, so that the display panel/speaker 205 displays an image and outputs a sound. Here, the demultiplexer 202 and the AV decoder 204 make up a presentation controller.

$$MC \geq MC' + \Delta t + T \quad (5)$$

Here, T represents a time corresponding to (PTS-PCR'). For example, in a case where MC, MC', and Δt are each expressed in hours, minutes, and seconds, T takes a value obtained by converting a 27-MHz clock count value represented by (PTS-PCR') into hours, minutes, and seconds.

Note that it is conceivable that MC, MC', and Δt each take a 27-MHz clock count value. In this case, T takes a value of (PTS-PCR') as it is. Furthermore, in the case where MC, MC', and Δt are each expressed in hours, minutes, and seconds, it is also conceivable that they are used while being converted into a 27-MHz clock count value.

Furthermore, Δt represents a network delay time and can be found in, for example, the operation of the PTP described above. In this case, the network delay time corresponds to "Delay(Master→Slave)" in Mathematical Formula (2) or "Delay(Slave→Master)" in Mathematical Formula (3). Note that this network delay time may be found by another means.

Figure 8:
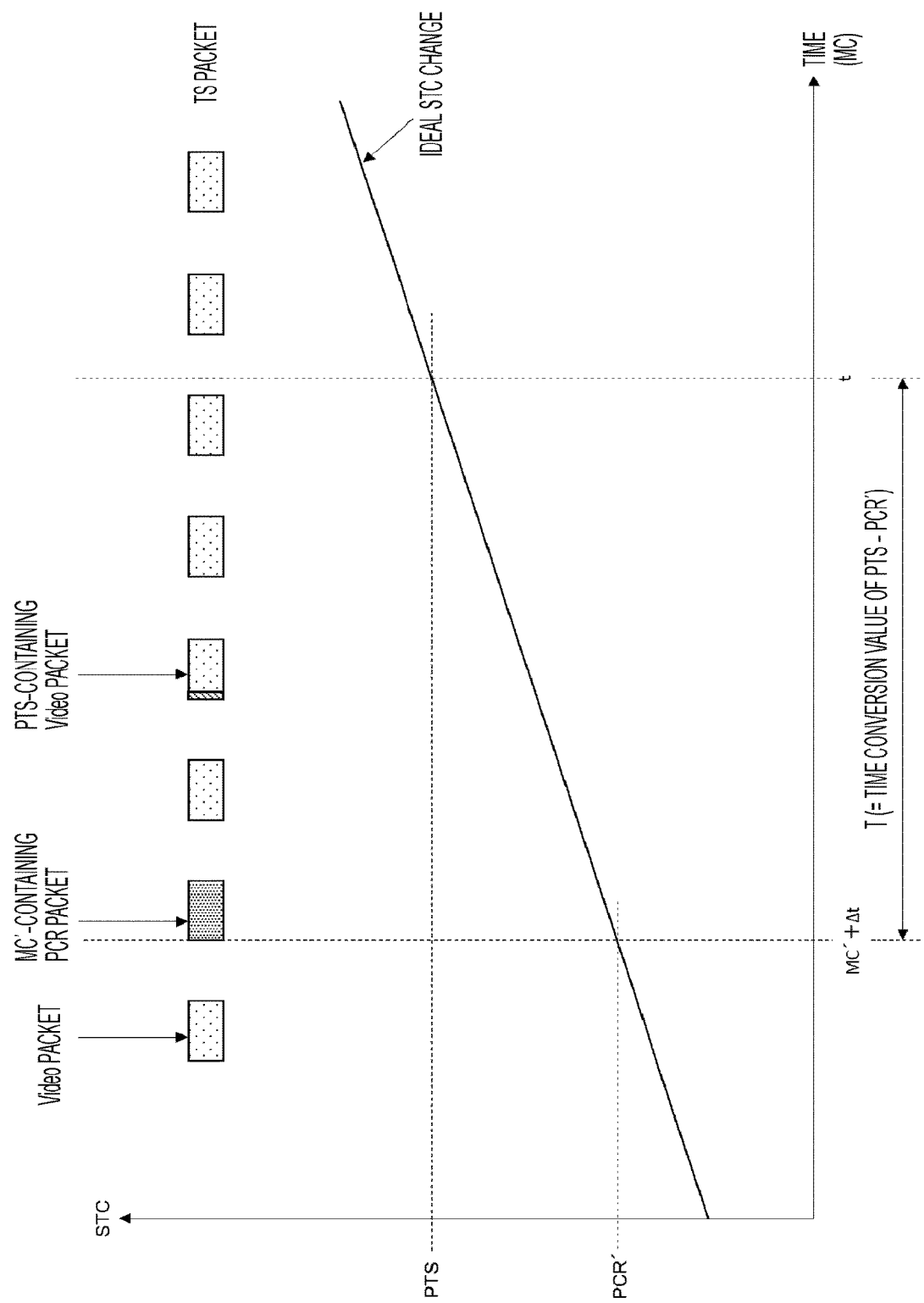
FIG. 8 is a diagram for explaining a mathematical formula for finding a presentation timing.

FIG. 8 illustrates a relationship among the respective terms in Mathematical Formula (5). An MC'-containing PCR packet is transmitted from the transmission side at a time of day of the MC'. This MC'-containing PCR packet arrives at the reception side at a time of day of (MC'+Δt) as illustrated in the figure in consideration of the network delay time Δt. This time of day corresponds to a PCR' in an ideal STC change, T represents a time elapsed from this time of day until the STC changes to the PTS, and t represents a time of day elapsed by T from the time of day of (MC'+Δt). The right side of Mathematical Formula (5) represents this time of day t which represents a presentation time of day based on the master clock MC.

Figure 9:
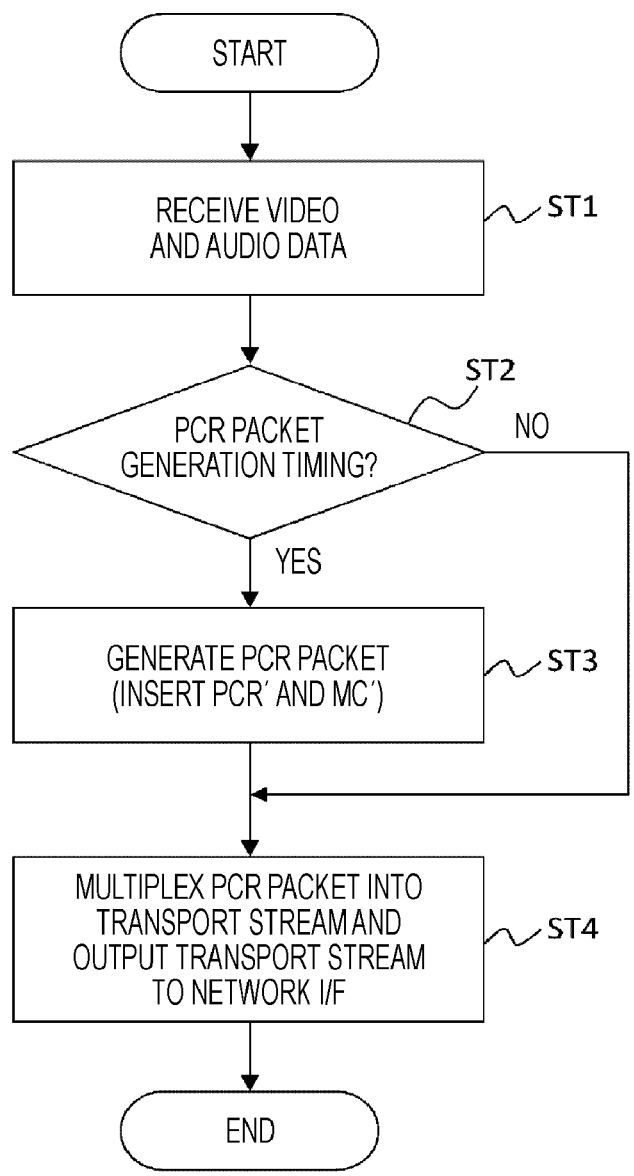
FIG. 9 is a flowchart that illustrates an example of a processing procedure in a multiplexer of the camera.

A flowchart of FIG. 9 illustrates an example of a processing procedure in the multiplexer 103 of the camera 100A. The multiplexer 103 repeatedly carries out processing tasks illustrated in the flowchart of FIG. 9. In step ST1, the multiplexer 103 receives video data and audio data from the AV encoder 102. In step ST2, next, the multiplexer 103 determines whether it is a timing to generate a PCR packet.

When it is a timing to generate a PCR packet, the multiplexer 103 generates a PCR packet in step ST3. In this PCR packet, a PCR' to which an STC generated by the system time clock generator 104 is referred, the PCR' being a PCR value as a reference time of day of a stream is inserted into an adaptation field, and an MC' of a master clock generated by the master clock generator 106, the MC' being a time of day brought into one-to-one correspondence with the PCR' described above, is inserted into a stuffing region.

After completion of the processing task in step ST3, the multiplexer 103 carries out the processing task in step ST4. Furthermore, when it is not a timing to generate a PCR packet in step ST2, the multiplexer 103 immediately carries out the processing task in step ST4. In step ST4, the multiplexer 103 multiplexes the PCR packet into a transport stream together with the video data and the audio data, and outputs the transport stream to the network interface 105.

Figure 10:
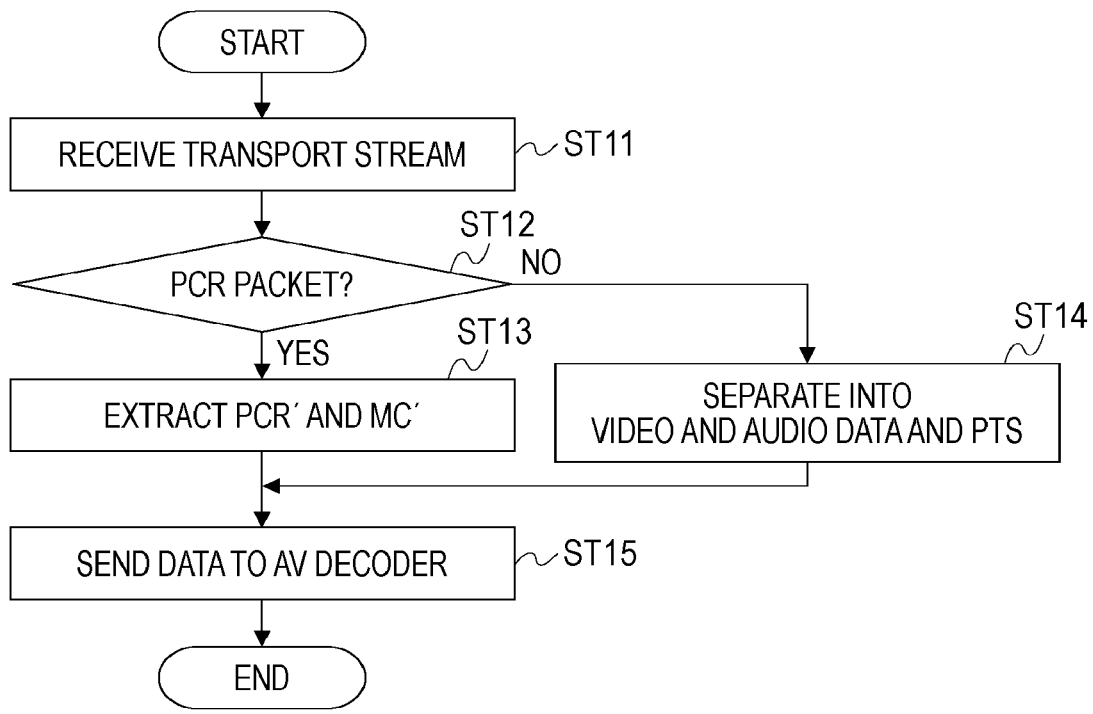
FIG. 10 is a flowchart that illustrates an example of a processing procedure in a demultiplexer of the display.

A flowchart of FIG. 10 illustrates an example of a processing procedure in the demultiplexer 202 of the display 200A. The demultiplexer 202 repeatedly carries out processing tasks illustrated in the flowchart of FIG. 10. In step ST11, the demultiplexer 202 receives the transport stream from the network interface 201.

Next, in step ST12, the demultiplexer 202 determines whether the transport stream contains a PCR packet. When the transport stream contains a PCR packet, the demultiplexer 202 extracts a PCR' and an MC' from the PCR packet in step ST13. On the other hand, when the transport stream contains no PCR packet, the demultiplexer 202 separates the transport stream into the video data, the audio data, and a PTS as presentation time-of-day information of the video data and audio data in step ST14.

After completion of the processing task in step ST13 and after completion of the processing task in step ST14, the demultiplexer 202 carries out the processing task in step ST15. In step ST15, the demultiplexer 202 sends the PCR', the MC', the video data, the audio data, and the PTS to the AV decoder 204.

Figure 11:
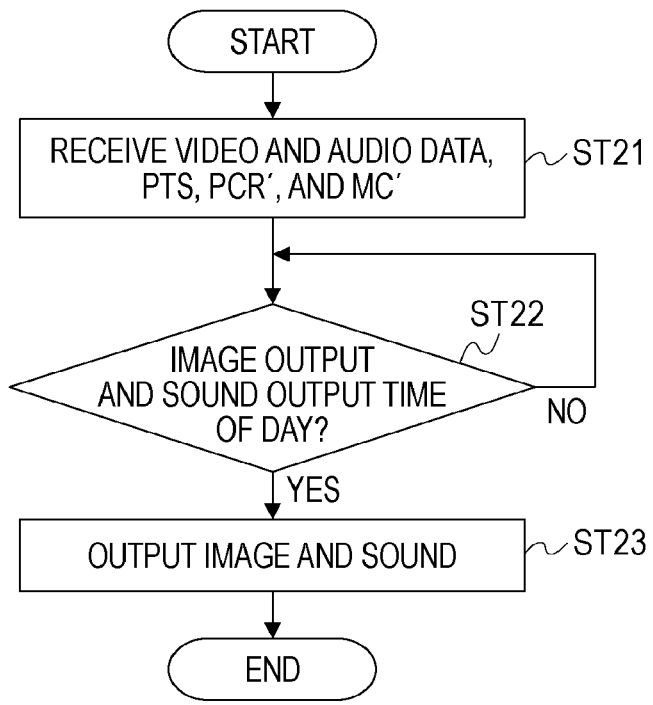
FIG. 11 is a flowchart that illustrates an example of a processing procedure in an AV decoder of the display.

A flowchart of FIG. 11 illustrates an example of a processing procedure in the AV decoder 204 of the display 200A. The AV decoder 204 repeatedly carries out processing tasks illustrated in the flowchart of FIG. 11. In step ST21, the AV decoder 204 receives the PCR', the MC', the video data, the audio data, and the PTS from the demultiplexer 202.

Next, in step ST22, the AV decoder 204 determines whether it is an image output and sound output time of day. This determination is made on the basis of Mathematical Formula (5) described above. The received video data and audio data are accumulated in the decoder buffer until the image output and sound output time of day comes. With regard to the presentation basis, when a master clock MC generated by the master clock generator 206 satisfies Mathematical Formula (5), the AV decoder 204 decodes the video data and the audio data in step ST23, and transmits the data to the display panel/speaker 205. The display panel/speaker 205 outputs an image and a sound.

As described above, in the transmission and reception system 10 illustrated in FIG. 6, the display 200A finds an image and sound presentation timing by video data and audio data, on the basis of a master clock (clock information) MC synchronized with a master clock (clock information) of the camera 100 on the transmission side.

Therefore, initial synchronization is achieved without depending on fluctuations of an IP packet transfer delay time in the network 300. It is possible to achieve a reduction in memory and low-latency encoding/decoding without unnecessary data accumulation for avoiding the underflow of the decoder buffer. Furthermore, it is possible to prevent occurrence of skipping for suppression of buffer overflow owing to unnecessary data accumulation and repetition owing to buffer underflow. It is also possible to improve image and sound media presentation quality.

Figure 12:
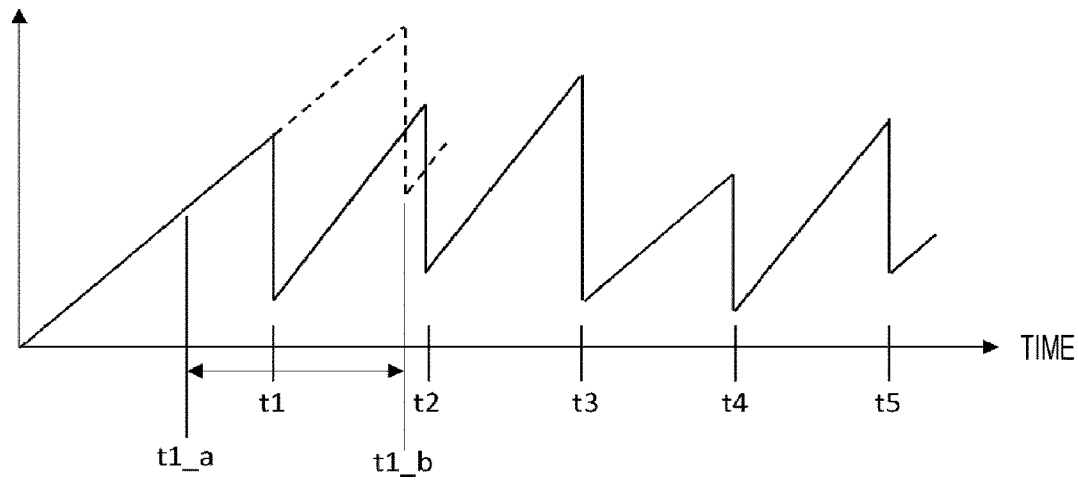
FIG. 12 is a diagram that illustrates an example of a relationship between an image display timing in each picture expected on an encoding side and an accumulation amount of a decoder buffer.

FIG. 12 illustrates an example of a relationship between an image display timing in each picture expected on the encoding side and an accumulation amount of the decoder buffer. The horizontal axis represents a time, and t1, t2, t3, . . . each represent a presentation timing indicated by a PTS in each picture. Among the presentation timings, the first presentation timing at t1 is called initial synchronization.

In the present technology, the presentation timing of each picture is found on the basis of the master clock (clock information) MC synchronized with the master clock (clock information) of the camera 100 on the transmission side. It is therefore possible to stably find the first presentation timing at t1. That is, it is possible to achieve the initial synchronization.

Therefore, there is no possibility that the underflow of the decoder buffer occurs because the first presentation timing is brought forward (see t1_a in FIG. 12). Furthermore, it is unnecessary to delay the first presentation timing (see t1_b in FIG. 12) in order to avoid the underflow of the decoder buffer. It is therefore possible to achieve low-latency encoding/decoding.

Furthermore, in the present technology, the presentation timing of each picture is found on the basis of the master clock (clock information) MC synchronized with the master clock (clock information) of the camera 100 on the transmission side. It is therefore possible to stably find the presentation timings at t2, t3, . . . , and it is also possible to prevent occurrence of skipping and repetition.

2. Second Embodiment

"Transmission and Reception System"

Figure 13:
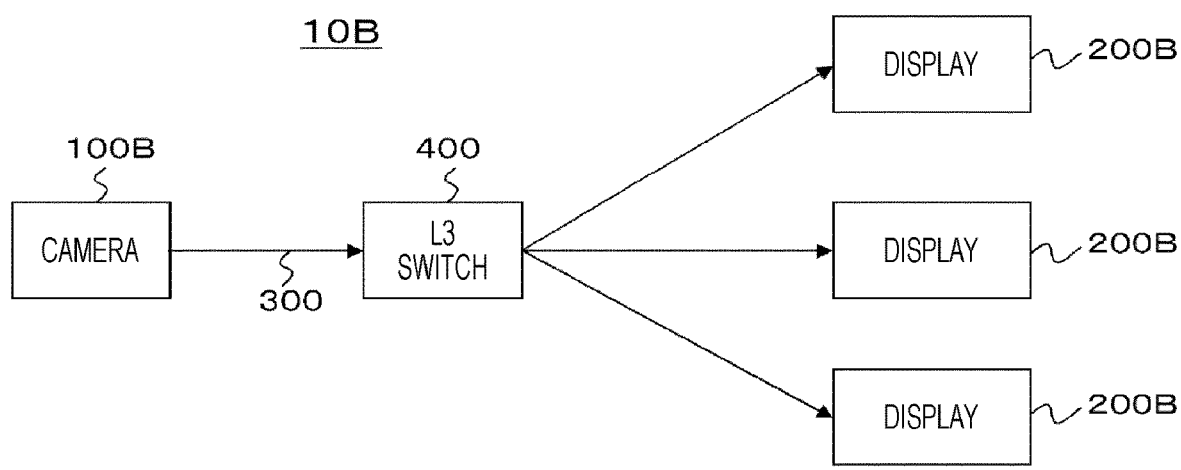
FIG. 13 is a diagram that illustrates a configuration example of a transmission and reception system as a second embodiment.

FIG. 13 illustrates a configuration example of a transmission and reception system 10B as a second embodiment. This transmission and reception system 10B includes a camera 100B and a plurality of displays 200B, three displays 200B herein, connected to this camera 100B via a network 300. In this case, an L3 switch 400 is disposed between the camera 100B and the three displays 200B, and an IP packet output from the camera 100B is multicast to the three display 200B.

Although not described in detail, the camera 100B is similar in configuration to the camera 100A of the transmission and reception system 10 in FIG. 6, except that a PCR packet further contains information of a network delay time. In the camera 100A, as described above, a PCR packet includes an adaptation field containing information of a PCR value (PCR') as a reference time of day of a stream, and a stuffing region containing information of an MC' as a time of day brought into one-to-one correspondence with the PCR'.

In contrast to this, in the camera 100B, a PCR packet includes an adaptation field containing information of a PCR value (PCR') as a reference time of day of a stream, and a stuffing region containing information of an MC' as a time of day brought into one-to-one correspondence with the PCR' and information of a network delay time $\Delta t$. Here, $\Delta t$ is set at a maximum time of network delay times between the camera 100B and the three displays 200B or a time longer than this maximum time.

Although not described in detail, the display 200B is similar in configuration to the display 200A of the transmission and reception system 10 in FIG. 6, except that the display 200B uses information of $\Delta t$ contained in a stuffing region of a PCR packet as the information of $\Delta t$ in Mathematical Formula (5) described above for finding the presentation (image output and sound output) timing.

Note that a master clock (clock information) generated by a master clock generator 106 of the camera 100B and a master clock (clock information) generated by a master clock generator 206 of each display 200B are synchronized with each other in advance, using a PTP and the like pursuant to, for example, an IEEE 1588 standard. Therefore, the master clocks (clock information) generated by the master clock generators 206 of the three displays 200B are also synchronized with one another.

As described above, in the transmission and reception system 10B illustrated in FIG. 13, each display 200B sets $\Delta t$ in Mathematical Formula (5) for finding the presentation timing, at the maximum time of the network delay times between the camera 100B and the three displays 200B or a time longer than this maximum time. Therefore, it is possible to equalize presentation timings found by the respective displays 200B and to achieve synchronization on image output and sound output from the respective displays 200B.

Figure 14:
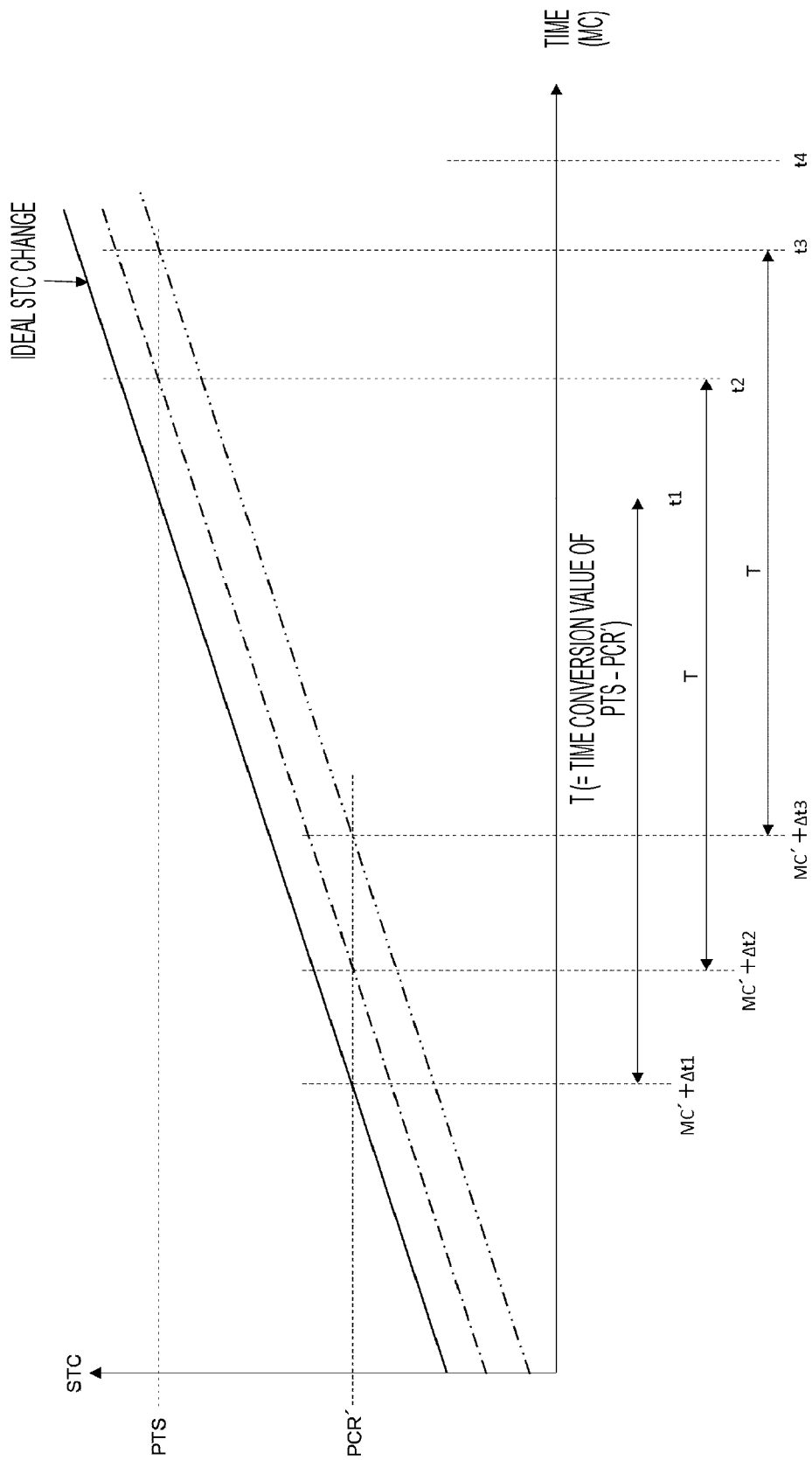
FIG. 14 is a diagram for explaining network delay information to be used in the mathematical formula for finding the presentation timing.

In FIG. 14, in a case where $\Delta t1$, $\Delta t2$, and $\Delta t3$ respectively represent network delay times between the camera 100B and the three displays 200B, t1, t2, and t3 represent presentation timings obtained using the respective network delay times. As described above, using the different network delay times, the presentation timings are also different from one another.

However, since each display 200B uses the maximum time $\Delta t3$ of the network delay times between the camera 100B and the three displays 200B or a time longer than the maximum time, it is possible to conform the presentation timing in each display 200B to t3 or the subsequent timing t4 and to achieve synchronization on image output and sound output from the respective displays 200B.

Furthermore, in the transmission and reception system 10B illustrated in FIG. 13, each display 200B uses the information of $\Delta t$ contained in the stuffing region of the PCR packet as the information of $\Delta t$ in Mathematical Formula (5) described above for finding the presentation timing. Therefore, each display 200B can easily acquire a network delay time for finding a presentation timing and can appropriately find the presentation timing.

Note that in the transmission and reception system 10B in FIG. 13, the information of $\Delta t$ for finding the presentation timing is supplied to each display 200B in such a manner that the camera 100B inserts the information of $\Delta t$ into the stuffing region of the PCR packet; however, a route or means for supplying the information of $\Delta T$ is not limited thereto. For example, it is also conceivable to determine and use the information of $\Delta T$ by mutual communications among the plurality of displays 200B, and the like.

3. Modifications

Note that the foregoing embodiments exemplify the cameras 100A and 100B each serving as a transmission apparatus and the displays 200A and 200B each serving as a reception apparatus; however, the present technology is not limited thereto. For example, it is conceivable that a transmission apparatus is an apparatus configured to reproduce video data and audio data from a storage, to convert the video data and audio data into a transport stream, to convert the transport stream into an IP packet, and to transmit the IP packet via a network. Furthermore, for example, it is conceivable that a reception apparatus has a configuration made up of a set top box and a display panel/speaker. Moreover, a display panel part may be a projector or the like.

Furthermore, in the foregoing embodiments, a system may be achieved in which the AV encoder 102, multiplexer 103, system time clock generator 104, network interface 105, and master clock generator 106 of the each of cameras 100A and 100B as a transmission apparatus are configured as separate components. Alternatively, a system may be achieved, in which the network interface 201, demultiplexer 202, AV decoder 204, and master clock generator 206 of each of the displays 200A and 200B as a reception apparatus are configured as separate components.

Furthermore, the foregoing embodiments exemplify an MPEG-2 transport stream as a multiplexed transport stream. The present technology may also be applicable to a multiplexed transport stream of another format, such as an MPEG media transport (MMT) stream.

Furthermore, preferred embodiments of the present disclosure have been described in detail with reference to the accompanying drawings; however, the technical scope of the present disclosure is not limited to such examples. It is evident that a person having ordinary knowledge in the technical field of the present disclosure is able to conceive various changes or modifications within the scope of the technical idea as defined in the appended claims, and it is to be understood that such changes or modifications may also fall within the technical scope of the present disclosure.

In addition, the advantageous effects described in the present specification are merely descriptive or illustrative but not limitative. That is, the technology related to the present disclosure may produce other advantageous effects apparent to those skilled in the art from the description of the present specification, in addition to the foregoing advantageous effects or in place of the foregoing advantageous effects.

Furthermore, the present technology can adopt the following configurations.

(1) A reception apparatus including:
a receiver configured to receive, via a network, an IP packet having a multiplexed transport packet containing media data; and
a presentation controller configured to process the IP packet and to control media presentation by the media data,
in which
the presentation controller controls a presentation timing on the basis of a network delay time in communication between a transmission side and the reception apparatus via the network.

(2) The reception apparatus as recited in (1), in which
the network delay time is based on information of time-of-day synchronization between the transmission side and the reception apparatus.

(3) The reception apparatus as recited in (2), in which
the time-of-day synchronization is time-of-day synchronization using a PTP.

(4) The reception apparatus as recited in any of (1) to (3), in which
the presentation controller controls the presentation timing on the basis of clock information of the reception apparatus, the clock information being brought into time-of-day synchronization with clock information of the transmission side.

(5) The reception apparatus as recited in (4), in which
the presentation controller controls the presentation timing, using first time-of-day information that is based on a system time clock of the transmission side and is contained in the multiplexed transport packet, second time-of-day information that is based on the clock information of the transmission side, is associated with the first time-of-day information, and is contained in the multiplexed transport packet, the network delay time, and the clock information of the reception apparatus.

(6) The reception apparatus as recited in (5), in which
the multiplexed transport packet is a TS packet making up an MPEG-2 transport stream,
a PCR packet contains a PCR value as the first time-of-day information and the second time-of-day information associated with the PCR value,
the TS packet contains a PTS value on a media data presentation basis, and
the presentation controller sets the presentation timing at a timing at which a time of day indicated by the clock information of the reception apparatus is a predetermined time of day that is not less than a time of day obtained by adding, to the second time-of-day information, the network delay time and a time corresponding to a value obtained by subtracting the PCR value from the PTS value.

(7) The reception apparatus as recited in any of (1) to (6), further including
a presentation unit configured to perform the media presentation by the media data.

(8) A reception method including:
a step of receiving, via a network, an IP packet having a multiplexed transport packet containing media data; and
a step of processing the IP packet and controlling media presentation by the media data,
in which
the media presentation controlling step includes controlling a presentation timing on the basis of a network delay time in communication between a transmission apparatus and a reception apparatus via the network.

(9) A transmission and reception system including:
a transmission apparatus; and
a reception apparatus connected to the transmission apparatus via a network,
in which
the transmission apparatus includes
a transmitter configured to transmit an IP packet having a multiplexed transport packet containing media data to the reception apparatus via the network,
the reception apparatus includes:
a receiver configured to receive the IP packet from the transmission apparatus via the network; and
a presentation controller configured to process the IP packet and to control media presentation by the media data, and
the presentation controller controls a presentation timing on the basis of a network delay time in communication between the transmission apparatus and the reception apparatus via the network.

(10) The transmission and reception system as recited in (9), in which
the network delay time is based on information of time-of-day synchronization between the transmission apparatus and the reception apparatus.

(11) The transmission and reception system as recited in (10), in which
the time-of-day synchronization is time-of-day synchronization using a PTP.

(12) The transmission and reception system as recited in any of (9) to (11), in which
the presentation controller controls the presentation timing on the basis of clock information of the reception apparatus, the clock information being brought into time-of-day synchronization with clock information of the transmission apparatus.

(13) The transmission and reception system as recited in (12), in which
the presentation controller controls the presentation timing, using first time-of-day information that is based on a system time clock of the transmission apparatus and is contained in the multiplexed transport packet, second time-of-day information that is based on the clock information of the transmission apparatus, is associated with the first time-of-day information, and is contained in the multiplexed transport packet, the network delay time, and the clock information of the reception apparatus.

(14) The transmission and reception system as recited in (13), in which
the multiplexed transport packet is a TS packet making up an MPEG-2 transport stream, a PCR packet contains a PCR value as the first time-of-day information and the second time-of-day information associated with the PCR value, the TS packet contains a PTS value on a media data presentation basis, and the presentation controller sets the presentation timing at a timing at which a time of day indicated by the clock information of the reception apparatus is a predetermined time of day that is not less than a time of day obtained by adding, to the second time-of-day information, the network delay time and a time corresponding to a value obtained by subtracting the PCR value from the PTS value.

(15) The transmission and reception system as recited in any of (9) to (14), in which the reception apparatus includes a plurality of the reception apparatuses, and each reception apparatus sets the network delay time at a maximum time of the network delay times between the transmission apparatus and the plurality of the reception apparatuses or a time longer than the maximum time.

(16) The transmission and reception system as recited in (15), further including an L3 switch disposed between the transmission apparatus and the plurality of the reception apparatuses, in which the IP packet output from the transmission apparatus is multicast to the plurality of the reception apparatuses.

(17) The transmission and reception system as recited in (15) or (16), in which the multiplexed transport packet is a TS packet making up an MPEG-2 transport stream, and a PCR packet further contains information of the network delay time.

(18) The transmission and reception system as recited in any of (9) to (17), in which the transmission apparatus includes a camera.

(19) The transmission and reception system as recited in any of (9) to (18), in which the reception apparatus includes a display.

REFERENCE SIGNS LIST 10, 10B Image distribution system
100A, 100B Camera
101 Imager/microphone
102 AV encoder
103 Multiplexer
104 System time clock generator
105 Network interface
106 Master clock generator
200A, 200B Display
201 Network interface
202 Demultiplexer
204 AV decoder
205 Display panel/speaker
206 Master clock generator
300 Network
400 L3 switch

The invention claimed is:

1. A reception apparatus, comprising:
a receiver configured to receive, via a network, an IP packet having a multiplexed transport packet containing media data; and
a presentation controller configured to process the IP packet and to control media presentation by the media data,
wherein the presentation controller is further configured to control a presentation timing based on a network delay time in communication between a transmission side and the reception apparatus via the network, and based on first time-of-day information that is based on a system time clock of the transmission side and is contained in the multiplexed transport packet and second time-of-day information that is based on clock information of the transmission side, is associated with the first time-of-day information, and is contained in the multiplexed transport packet.

2. The reception apparatus according to claim 1, wherein the network delay time is based on information of time-of-day synchronization between the transmission side and the reception apparatus.

3. The reception apparatus according to claim 2, wherein the time-of-day synchronization is time-of-day synchronization using a PTP.

4. The reception apparatus according to claim 1, wherein the presentation controller is further configured to control the presentation timing based on clock information of the reception apparatus, the clock information being brought into time-of-day synchronization with the clock information of the transmission side.

5. The reception apparatus according to claim 1, wherein the presentation controller is further configured to control the presentation timing further based on clock information of the reception apparatus.

6. The reception apparatus according to claim 5, wherein the multiplexed transport packet is a TS packet making up an MPEG-2 transport stream,
a PCR packet contains a PCR value as the first time-of-day information and the second time-of-day information associated with the PCR value,
the TS packet contains a PTS value on a media data presentation basis, and
the presentation controller is further configured to set the presentation timing at a timing at which a time of day indicated by the clock information of the reception apparatus is a predetermined time of day that is not less than a time of day obtained by adding, to the second time-of-day information, the network delay time and a time corresponding to a value obtained by subtracting the PCR value from the PTS value.

7. The reception apparatus according to claim 1, further comprising a presentation unit configured to perform the media presentation by the media data.

8. A reception method, comprising:
receiving, via a network, an IP packet having a multiplexed transport packet containing media data; and
processing the IP packet and controlling media presentation by the media data, wherein the media presentation controlling step includes controlling a presentation timing based on a network delay time in communication between a transmission side and a reception apparatus via the network, and based on first time-of-day information that is based on a system time clock of the transmission side and is contained in the multiplexed transport packet and second time-of-day information that is based on clock information of the transmission side, is associated with the first time-of-day information, and is contained in the multiplexed transport packet.

9. A transmission and reception system, comprising:
a transmission apparatus; and
a reception apparatus connected to the transmission apparatus via a network,
wherein the transmission apparatus includes
a transmitter configured to transmit an IP packet having a multiplexed transport packet containing media data to the reception apparatus via the network,
the reception apparatus includes:
a receiver configured to receive the IP packet from the transmission apparatus via the network; and
a presentation controller configured to process the IP packet and control media presentation by the media data, and
the presentation controller is further configured to control a presentation timing based on a network delay time in communication between the transmission apparatus and the reception apparatus via the network, and based on first time-of-day information that is based on a system time clock of the transmission apparatus and is contained in the multiplexed transport packet and second time-of-day information that is based on clock information of the transmission apparatus, is associated with the first time-of-day information, and is contained in the multiplexed transport packet.

10. The transmission and reception system according to claim 9, wherein the network delay time is based on information of time-of-day synchronization between the transmission apparatus and the reception apparatus.

11. The transmission and reception system according to claim 10, wherein the time-of-day synchronization is time-of-day synchronization using a PTP.

12. The transmission and reception system according to claim 9, wherein the presentation controller is further configured to control the presentation timing based on clock information of the reception apparatus, the clock information being brought into time-of-day synchronization with the clock information of the transmission apparatus.

13. The transmission and reception system according to claim 9, wherein the presentation controller is further configured to control the presentation timing further based on clock information of the reception apparatus.

14. The transmission and reception system according to claim 13, wherein
the multiplexed transport packet is a TS packet making up an MPEG-2 transport stream,
a PCR packet contains a PCR value as the first time-of-day information and the second time-of-day information associated with the PCR value,
the TS packet contains a PTS value on a media data presentation basis, and
the presentation controller is further configured to set the presentation timing at a timing at which a time of day indicated by the clock information of the reception apparatus is a predetermined time of day that is not less than a time of day obtained by adding, to the second time-of-day information, the network delay time and a time corresponding to a value obtained by subtracting the PCR value from the PTS value.

15. The transmission and reception system according to claim 9, wherein
the reception apparatus comprises a plurality of the reception apparatuses, and
each reception apparatus sets the network delay time at a maximum time of the network delay times between the transmission apparatus and the plurality of the reception apparatuses or a time longer than the maximum time.

16. The transmission and reception system according to claim 15, further comprising
an L3 switch disposed between the transmission apparatus and the plurality of the reception apparatuses,
wherein the IP packet output from the transmission apparatus is multicast to the plurality of the reception apparatuses.

17. The transmission and reception system according to claim 15, wherein
the multiplexed transport packet is a TS packet making up an MPEG-2 transport stream, and
a PCR packet further contains information of the network delay time.

18. The transmission and reception system according to claim 9, wherein the transmission apparatus comprises a camera.

19. The transmission and reception system according to claim 9, wherein the reception apparatus comprises a display.

* * * * *